CROSS REFERENCE SEARCH ROOM
350-96.15 SR
XR 3,455,667
64Y

METHOD OF MAKING OPTICAL COUPLERS

Filed May 6, 1966

INVENTOR.
ELIAS SNITZER
WILFRED P. BAZINET, JR.
DAVID C. HWALEK
BY J. Albert Hultquist
ATTORNEY

3455667

United States Patent Office 3,455,667
Patented July 15, 1969

3,455,667

METHOD OF MAKING OPTICAL COUPLERS

Elias Snitzer, Sturbridge, Wilfred P. Bazinet, Jr., Webster, and David C. Hwalek, Southbridge, Mass., assignors, by mesne assignments, to American Optical Corporation, a corporation of Delaware Filed May 6, 1966, Ser. No. 548,259
Int. Cl. C03b 23/22
U.S. Cl. 65—4 3 Claims

ABSTRACT OF THE DISCLOSURE

Forming light-channeling glass wafers of long and thin rectangular pieces of glass of preselected relatively high refractive index arranged in a Y formation and separated by intimately interfitted longitudinally extending glass wedges of lower refractive index wherein the assembly of pieces and wedges is drawn to a reduced cross-sectional size and cut transversely into thin sections which constitute the wafers across each of which light may be channeled through said glasses of high refractive index.

This invention relates to optical couplers and has particular reference to a method of making optical junction devices for joining plural light paths in optical systems.

The present invention deals with the manufacture of optical junction devices which comprise, in general, the arrangement of three triaxially disposed relatively long and thin light-conducting channel members having their corresponding one ends interconnected to form a light-transmitting junction. From such junction, the channel members extend radially in a Y formation. Each channel member is formed of glass having a preselected relatively high index of refraction and is surrounded by other glass having a lower refractive index.

According to principles of the present invention, the aforementioned glasses are all fused together as a unit which is capable of conducting light through its channel members toward and from their junction by the well-known principles of internal reflection.

It is contemplated that the unit be utilized as coupling means in such optical circuitry as, for example, that which may be employed to conduct light to and from a number of logic elements in a computer system on similar technology. Light directed into a particular one channel member toward its junction will divide at the junction while light directed toward the junction through two channel members will combine at the junction. Thus, the unit becomes a natural candidate for the distribution of light between a number of discrete light paths or for collection of light from multiple paths to a lesser number or single path in optical circuitry.

In relating more particularly to the manufacture of optical junction devices characterized as above, it is an object of the present invention to provide a simple, economical and generally highly efficacious method of producing such devices.

Another object is to provide a manufacturing process which is geared for mass production and capable of producing items of the aforementioned character substantially without limitation as to their size.

To attain the aforesaid objects and others which may appear from the following detailed description, in accordance with principles of this invention, we construct an assembly of a number of relatively long and thin longitudinally disposed interfitted pieces of glass. Each piece has the cross-sectional configuration of a one component part of the particular type of junction device intended to be formed. It is positioned in the assembly in such prearranged geometrical relationship with the other pieces as to form, through any cross-section of the assembly, the overall configuration of the desired radially disposed channel member glasses and surrounding glasses of each junction device.

The assembly is heated and drawn to a reduced cross-sectional size and cut transversely of its length into a number of wafer-like sections. Each section thus comprises a fused glass junction device of the character contemplated herein.

The present invention will be more fully understood by reference to the following detailed description which is accompanied by a drawing in which FIG. 1 illustrates, in perspective, a type of optical junction coupling device and associated optical circuitry useful in understanding the present invention;

FIG. 2 is a perspective view of an assembly of glass pieces used to form coupling devices according to principles of this invention, the pieces being shown in spaced relationship with each other for clarity of illustration;

FIGS. 3, 4, 5 and 6 diagrammatically illustrate exemplary apparatus and steps used in processing the aforementioned assembly according to the invention;

Figure 1:
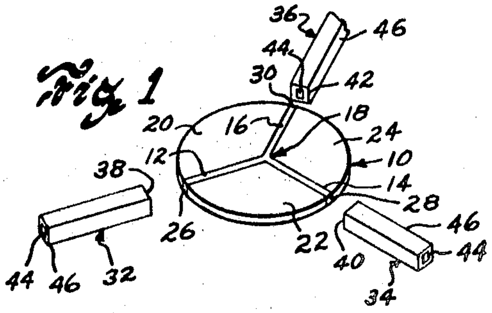

Referring now to FIG. 1 there is shown junction device 10 which is illustrative of one form of optical coupler which may be fabricated according to principles of this invention.

Junction device 10 comprises three long and thin light-conducting channel members 12, 14 and 16 arranged in a Y formation with their corresponding one ends fused together so as to form light-conducting junction 18. Channel members 12, 14 and 16 are each formed of glass having a relatively high refractive index and are radially spaced from one another by pieces 20, 22 and 24 of glass having a lower refractive index than channel members 12, 14 and 16. The channel members and glass pieces are all fused together as a unit. Thus, according to the well-known principles of total internal reflection, junction device 10 will conduct light toward and from junction 18 through channel members 12, 14 and 16.

As an optical coupler, junction device 10 is adapted to interconnect a plurality of light conductors in an optical circuit by receiving light-emitting or light-receiving ends of such light conductors at outermost ends 26, 28 and 30 of channel members 12, 14 and 16 respectively. Exemplary light conductors 32, 34 and 36 are, for clarity of illustration, shown in FIG. 1 as having their ends 38, 40 and 42 spaced from junction device 10. Ordinarily, ends 38, 40 and 42 would be placed directly against ends 26, 28 and 30 of channel members 12, 14 and 16 so as to become optically interconnected by junction device 10. Furthermore, and only for purposes of illustration, light conductors 32, 34 and 36 are shown as being in the form of optical fibers each comprising a single core 44 of light-conducting material having a relatively high refractive index surrounded by cladding 46 of material having a lower refractive index than the core. Such optical fibers and their principles of operation in conducting light by total internal reflection are well known in the art and, accordingly, should not require further explanation.

It will become apparent hereinafter that junction device 10 may be formed to any desired shape and size. Furthermore, while only one junction device 10 is illustrated in FIG. 1, it should also be apparent that a multifunction optical network may be constructed by incorporating additional similar devices in an optical circuit.

Figure 2:
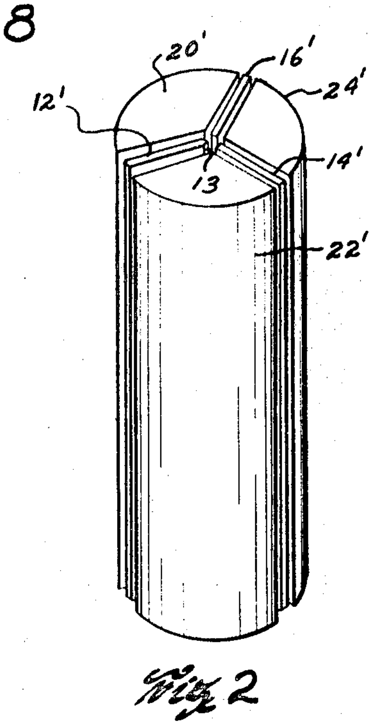

According to principles of the present invention, optical junction devices of the aforementioned character are mass produced in an operation yielding a relatively large number thereof. This is accomplished by cutting from relatively long sections of glass a number of pieces each having the cross-sectional configuration of one of the components of a particular form of junction device intended to be formed, e.g. junction device 10. These pieces are illustrated in FIG. 2 and are identified by reference numerals 12', 14', 16' and 20', 22', 24'. It will be noted that their cross-sectional shapes and relative proportions correspond to those of components 12, 14, 16, and 20, 22, 24 respectively of device 10 but that they are of greater cross-sectional size and length.

The lengths of pieces 12', 14' 16' and 20', 22', 24', all being approximately equal, are preselected to be such that when they are assembled in side-by-side relationship as will be described in greater detail hereinafter, the assembly will not be ungainly but, at the same time, comprise a volume of glasses sufficient to ultimately produce a great number of junction devices. For example, an assembly having an outside diameter of approximately 1½ inches may have a length of from 3 to 12 inches. Shorter or longer assemblies can be used.

Pieces 12', 14', 16' and 20', 22', 24' are all formed of glasses which are compatible in their softening points and expansion coefficients so that the assembly thereof may be readily fused and drawn down to a smaller cross section. In addition, the glasses are preselected to have such refractive index values as to render junction devices from therefrom internally reflective to light caused to enter respective channel members 12, 14, and 16.

It has been found, however, that while channel members 12, 14 and 16 may be formed of pieces of glass 12', 14', and 16' all having the same index of refraction, such like glasses have a tendency to form minute bubbles at their interfaces when fused while unlike glasses do not.

Since pieces 12', 14' and 16' are intended to be fused together to form a junction therebetween (junction 18 in device 10), bubbles formed at such a junction would tend to scatter light and lower the efficiency of the system. Accordingly it is contemplated that one of pieces 12', 14' and 16' be formed of a slightly different glass than that of the other two and that said one piece (12', for example) be provided with a roof-shaped edge 13 (FIG. 2) against each side of which one of the other two pieces (14' and 16') are fused substantially without being fused directly to each other.

A typical assembly of glasses formed according to the principles set out above and actually tested after fusion comprised piece 12' formed of a flint glass having a relatively high refractive index of 1.75, an expansion coefficient of $83 \times 10^{-7}/°$ C. and softening point of 549° C. Pieces 14' and 16' were each formed of flint glass having an index of refraction of 1.76, expansion coefficient of $92 \times 10^{-7}/°$ C. and softening point of 549° C.; and pieces 20', 22' and 24' were formed of a soft soda lime glass having an index of refraction of 1.52, expansion coefficient of $93 \times 10^{-7}/°$ C. and softening point of approximately 700° C.

Prior to assembling glass pieces 12', 14' 16' and 20', 22', 24' their sides and edges which are intended to be brought together and subsequently fused are all ground and highly polished. They are then fastened together with a readily removable connecting medium such as wax or an equivalent adhesive material so as to form assembly 48 illustrated in FIG. 3. The connecting medium is applied in thin layers between the glass pieces.

Assembly 48 is next cylindrically ground to an oversized outer diameter. The diameter being such that when the wax or other connecting medium is subsequently removed and pieces 12', 14', 16' and 20', 22', 24', are reassembled therewithout, the diametral size of reassembly 48' (FIG. 4) will fit snugly into glass tube 50 having a known inner diametral dimension.

It should be understood that the outwardly exposed sides of pieces 12', 14', 16' and 20', 22', 24' originally needed not be smoothly finished or even arcuately shaped as they are shown in FIG. 2. Any irregularities in the shape of such sides of the aforementioned pieces of assembly 48 will be removed when the assembly is cylindrically ground.

Figure 3:
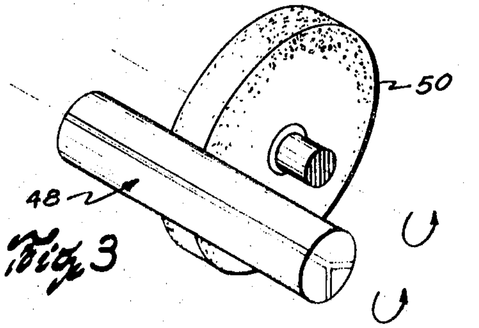

Conventional cylindrical grinding apparatus well known and commonly used in the art is employed to perform the grinding operation depicted in FIG. 3. Only grinding wheel 50 of the grinding apparatus is shown. From this it should be apparent that when both wheel 50 and assembly 48 are rotated about their respective axes, which are disposed parallel to each other, and one is moved longitudinally along its axis relative to the other, assembly 48 will be ground to a true cylindrical shape. The diametrical size of assembly 48 is determined by the extent to which it is moved toward wheel 50. The grinding operation may comprise rough and fine grinding steps performed in conventional fashion. The outer ground surface of assembly 48 may also, but need not necessarily, be polished.

Once assembly 48 is formed to the desired diametral size, its pieces 12', 14', 16' and 20', 22', 24' are separated and thoroughly cleaned of the aforementioned wax or whatever connecting medium is used. This is accomplished by melting and/or washing away such medium with a solvent such as, for example, xylene. Thereupon, pieces 12', 14', 16' and 20', 22', 24' are again interfitted as reassembly 48' and placed within holding tube 50.

Tube 50 is formed of a glass preferably having approximately the same coefficient of expansion and melting point as the aforementioned glasses of pieces 20', 22' and 24' and/or pieces 12', 14', 16'. Conventional soda lime laboratory tubing may be used for this purpose.

Figures 4, 5, 6, 7:
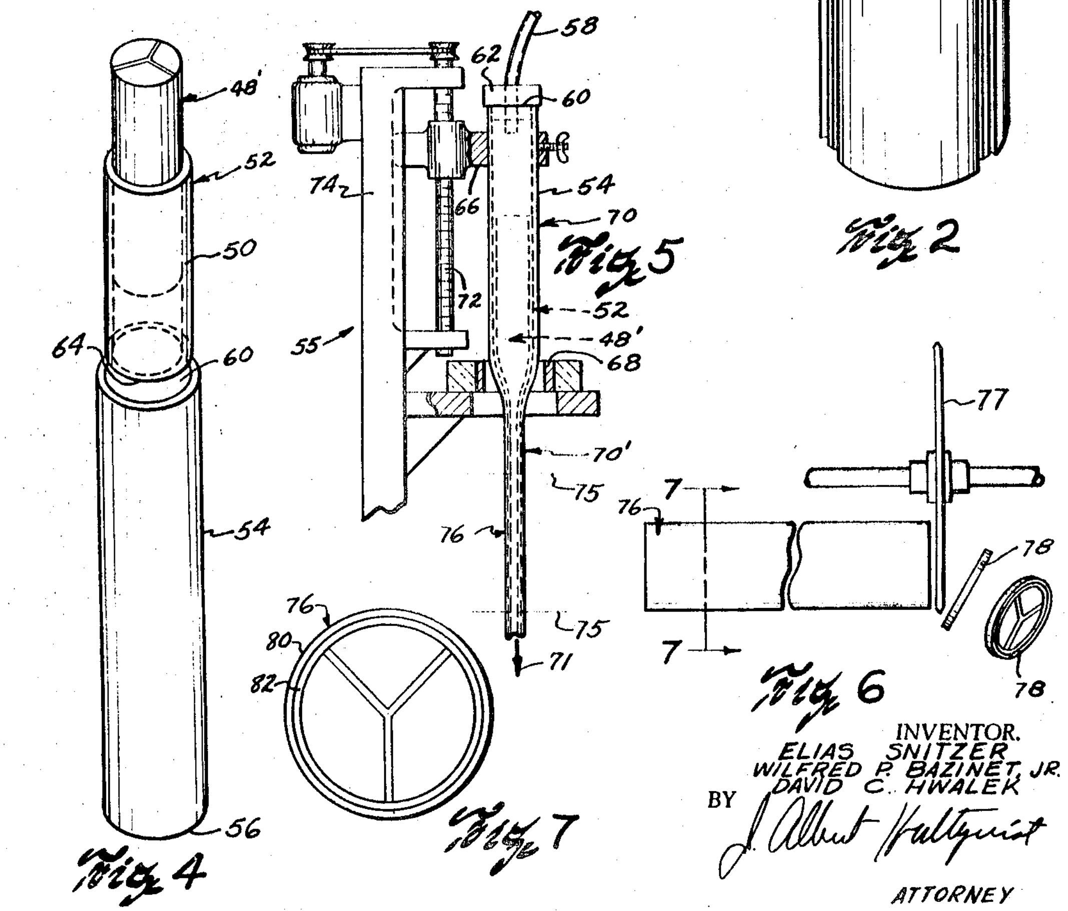
FIG. 7 is an enlarged cross-sectional view taken on line 7—7 in FIG. 6.

For convenience in adapting the combination 52 of reassembly 48' and tube 50 to fusing and drawing apparatus 55, it is preferably placed within a second tube 54 of glass similar to that of tube 50 (see FIGS. 4 and 5).

Tube 54 having a closed one end 56 is fitted with vacuum line 58 (see FIG. 5) entered into its opposite end 60. End 60 of tube 54 is sealed gas tight with stopper 62 through which line 58 extends from a remotely located conventional vacuum pump (not shown) By such means, air and gases in the interior of tube 54 and interstices between glass pieces 12', 14', 16' and 20', 22', 24' are continuously evacuated during subsequent fusing and drawing of the whole assembly.

It should be understood that tube 54 can be dispensed with by having end 64 of tube 50 closed and its length sufficient to receive both reassembly 48' and stopper 62.

Which ever arrangement is used, it is supported in fusing and drawing apparatus 55 substantially as illustrated with respect to the arrangement including tube 54 in FIG. 5.

There tube 54 is clamped in fixture 66. Fixture 66 supports the tube vertically with its end 56 depending through heating ring 68. Ring 68 which may comprise either an annular electrically operated heating element or gas burner is adapted to heat the glasses of tube 54, tube 52 and reassembly 48' to fusing and drawing temperature. The whole assembly 70 (FIG. 5) of such glasses is gradually lowered longitudinally through heating ring 68. Motor driven screw 72 threaded through fixture 66 and journaled adjacent its opposite ends in frame 74 of apparatus 55 is used to effect the lowering of assembly 70.

As assembly 70 is gradually lowered through heating ring 68 its heated depending end is baited and drawn in the direction of arrow 71 at a uniform rate greater than that of the lowering thereof while air and gases are continuously evacuated from within tube 54 through vacuum line 58. Thereby, a clean bubble free interfacial fusion between pieces 12', 14', 16' and 20', 22', 24' is effected progressively along the length of reassembly 48' and all components of assembly 70 are reduced proportionally and uniformly to a desired cross-sectional size.

An assembly 70 having an outer diameter of approximately 1¼ inches and formed of the aforementioned exemplary glasses was actually fused and drawn to a reduced diameter of approximately one inch. To do so the assembly was drawn at a rate of approximately one inch in twenty minutes under heat of approximately 750° C. applied thereto by a heating element such as element 68 illustrated in FIG. 5.

When a substantial portion 70' (FIG. 5) of the length of assembly 70 has been drawn to a desired diametral size, such portion 70' or a section 76 thereof, e.g. between dot-dash lines 75, is cut, broken away or otherwise removed from remaining glasses of assembly 70 and annealed to relieve residual stresses and/or strain therein. For a section 76 formed of the aforementioned glasses, a typical annealing cycle would include heating the section to approximately 520° C. and thereafter gradually reducing the temperature to approximately 400° C. at a rate of approximately 1½° per hour. Upon reaching 400° C., the glass section may be reduced to room temperature at any desired rate such that the glass structure will not be broken.

It is to be understood, however that the present invention also contemplates the drawing of portion 70' to a diametral size as small as one half of a millimeter or even less. This may be accomplished in a single drawing operation such as described above with relation to FIG. 5 or by reheating and redrawing a section, (e.g. section 76) of portion 70'. In the event that portion 70' is drawn to a size as small as approximately one half of a millimeter or less, the aforementioned annealing cycle may obviously be dispensed with.

Following removal of section 76 from the remaining glasses of assembly 70 and annealing thereof, when such is required, it is sawn with saw 77 or otherwise cut transversely of its length into a number of pieces 78 (FIG. 6).

Each piece 78 thereby comprises a fused junction device circumferentially surrounded by glasses 80 and 82 of tubes 54 and 50. Glasses 80 and 82 may be completely removed from pieces 78, by grinding, to render each piece similar to junction device 10 of FIG. 1 or they may be removed only to the extent of exposing outer ends of pieces 12', 14' and 16' which now comprise channel members 12, 14, and 16 of the junction device. In either case, the removal of glasses 80 and 82 may be effected prior to the cutting of section 76 or they may be later removed from each piece 78 individually.

Figure 8:
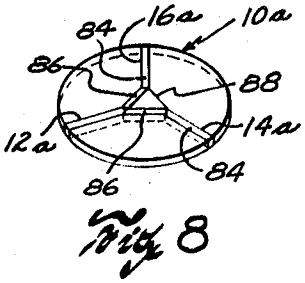
FIG. 8 illustrates an alternative form of coupling device which may be formed according to principles of our invention.

It is to be understood that while channel members 12, 14 and 16 of junction device 10 are shown and described each being formed of a single piece of glass, it may be desirable to form at least some of such channel members of a plurality of interconnected pieces of glass as illustrated in FIG. 8, for example. Junction device **10*a* in FIG. 8 comprises channel members 12*a*, 14*a* and 16*a* wherein members 14*a* and 16*a* are each formed of two pieces of glass 84 and 86 and pieces 84 are separated by still another piece or wedge of glass 88. It is contemplated that this latter form of junction device or variations thereof, with or without wedge 88** and/or the addition of other glass pieces, may be formed as a fused unit by practice of the above-described method.

We claim:

1. The method of making fused light-channeling glass wafers from at least three long and thin generally rectangular pieces of glass having preselected high indices of refraction and a corresponding number of long and thin wedges of glass having a lower refractive index than that of any of said pieces wherein the method comprises the steps of:

arranging the glass pieces in a radial Y formation with one of the longest edges of each adjoining a corresponding edge of the others of said pieces and with said glass wedges interfitted longitudinally intimately between the radial extensions of said pieces whereby upon fusion of said glass pieces and wedges together as a unit, the integrated structure will conduct light transversely of its longitudinal dimension by the principles of total internal reflection through said pieces of relatively high refractive index from at least one outermost edge of one of said pieces through the internal adjoinment of said corresponding edges and to outermost edges of the remaining number of said pieces;

heating the assembly of said glass pieces and wedges to a temperature sufficient to effect said fusion of its component parts one to another and permit drawing thereof;

drawing the heated assembly to a reduced cross sectional size; and cutting said fused and drawn assembly transversely into a number of thin sections to form said glass wafers across which from one edge to another light may be channeled by the principles of total internal reflection through respective glasses thereof having said preselected high refractive indices.

2. The method according to claim 1 wherein the assembly of said glass pieces and wedges is placed within a tube of glass for maintaining its integrity during said heating and drawing steps and said tube is heated, drawn and cut transversely along with said assembly.

3. The method according to claim 2 further including the step of removing at least the portions of said tube adjacent outermost edges of said glasses of preselected high refractive index in each of said wafers.

References Cited

UNITED STATES PATENTS

| | | | |
|---|---|---|---|
| 1,926,552 | 9/1933 | Morgan | 65—4 XR |
| 2,608,722 | 9/1952 | Stuetzer | 65—4 XR |
| 2,752,731 | 7/1956 | Altosaar | 65—4 XR |
| 2,915,661 | 12/1959 | Lederer. | |
| 3,128,408 | 4/1964 | Goodrich et al. | |
| 3,190,735 | 6/1965 | Kapany. | |
| 3,211,540 | 12/1965 | Cole | 65—61 XR |
| 3,278,283 | 10/1966 | Bazinet | 65—38 XR |
| 3,350,183 | 10/1967 | Siegmund et al. | 65—38 XR |

S. LEON BASHORE, Primary Examiner

F. W. MIGA, Assistant Examiner

U.S. Cl. X.R.

65—38, 42, 54, 56; 350—96, 169